United States Patent [19]

Hüsges et al.

[11] Patent Number: 4,726,871
[45] Date of Patent: Feb. 23, 1988

[54] CONTINUOUSLY OPERABLE PRESS FOR THE MANUFACTURE OF LAMINATES

[75] Inventors: Walter Hüsges, Niederkrüchten; Wolfgang Götz, Krefeld-Fischeln, both of Fed. Rep. of Germany

[73] Assignee: G. Siempelkamp GmbH & Co., Krefeld, Fed. Rep. of Germany

[21] Appl. No.: 850,492

[22] Filed: Apr. 10, 1986

[30] Foreign Application Priority Data

Apr. 12, 1985 [DE] Fed. Rep. of Germany ....... 3513136

[51] Int. Cl.$^4$ .......................... B23P 19/04; B31F 5/00; B29C 33/70
[52] U.S. Cl. ..................................... 156/389; 156/423; 156/494; 156/497; 156/555; 156/582; 156/583.5; 29/426.3; 29/700; 29/791; 29/DIG. 44; 100/93 RP; 425/186; 425/188; 425/194; 425/373; 425/182
[58] Field of Search ............... 156/581, 582, 584, 389, 156/497, 537, 538, 583.5, 583.91, 423, 494, 555; 100/93 RP, 155 R, 162 R, 168; 425/186, 188, 194, 373, 182; 29/426.3, 426.1, 700, 791, DIG. 44

[56] References Cited

U.S. PATENT DOCUMENTS

| | | | |
|---|---|---|---|
| 2,696,638 | 12/1954 | Bower | 100/168 |
| 3,106,153 | 10/1963 | Westbrook | 100/168 |
| 3,289,282 | 12/1966 | Shaffer | 29/700 |
| 3,663,340 | 5/1972 | Ross | 156/582 |

FOREIGN PATENT DOCUMENTS 3506423 4/1986 Fed. Rep. of Germany ...... 425/194

Primary Examiner—Jerome Massie
Assistant Examiner—J. Davis
Attorney, Agent, or Firm—Karl F. Ross; Herbert Dubno

[57] ABSTRACT

A continuously operable press for the manufacture of laminates and similar products has a heated press roll, two guide rolls, and at least one tensioning roll. One end of the rolls is journaled in bearings at a fixed support wall and the other end of each roll is removably journaled in bearings of a movable support wall. A pressure belt is passing over the rolls, but a decorating roll sleeve can be slid on and of from the press roll, and this provides a decoration on the adjacent laminate surface. The press has a device for lifting the relaxed pressure belt so as to remove the decorating roll sleeve. The lifter device has at least two transverse lift bars with suction heads, and the lift bars are distributed about the upper circumferential region of the press roll. Compressed air can be introduced between the press roll and the decorating roll sleeve when taking the decorating roll sleeve from the press roll. The movable support wall comprises a clamping assembly for holding the decorating roll sleeve during removal from the press roll.

16 Claims, 6 Drawing Figures

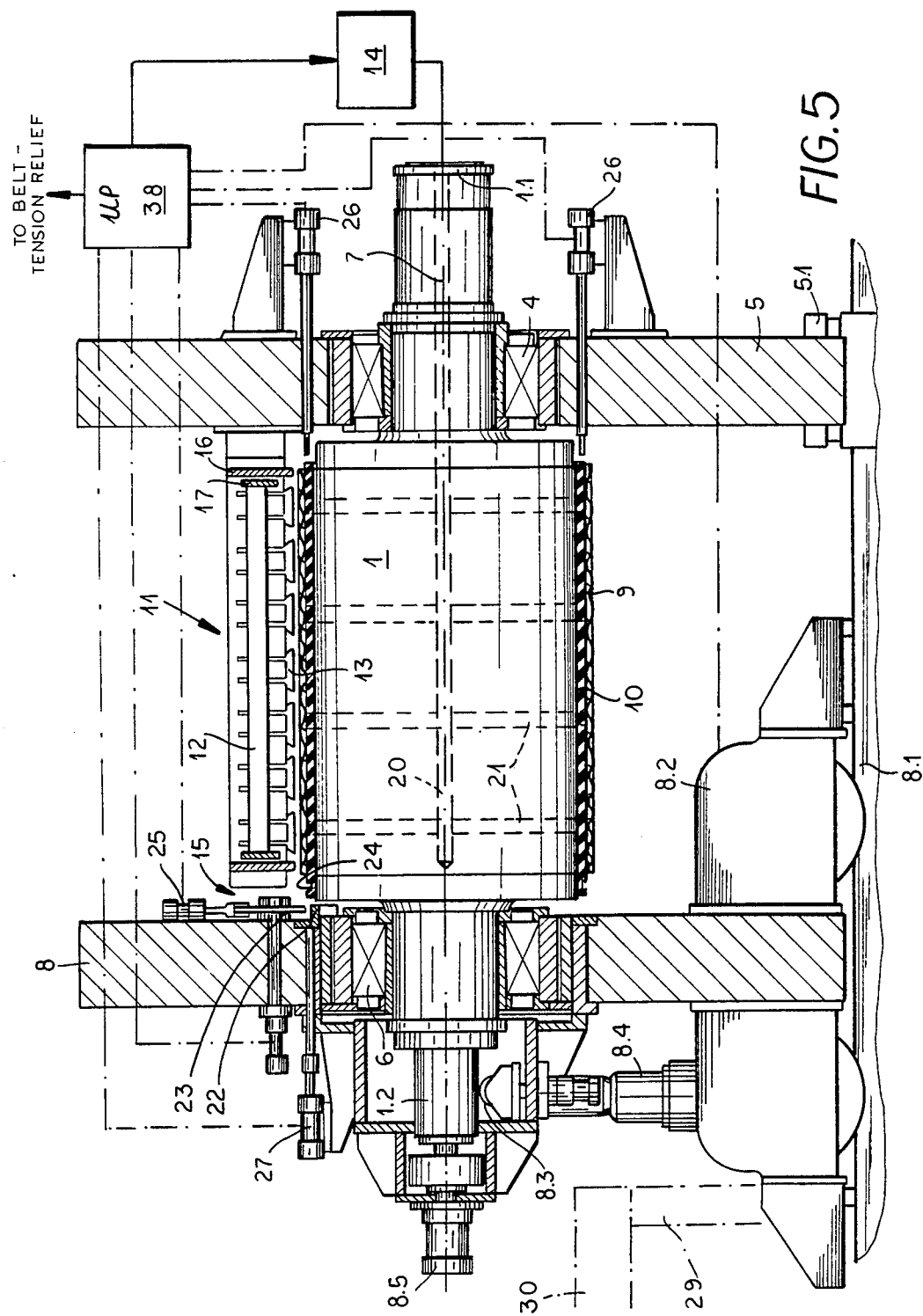

CONTINUOUSLY OPERABLE PRESS FOR THE MANUFACTURE OF LAMINATES

FIELD OF THE INVENTION

Our present invention relates to a continuously operable press for the manufacture of laminates and, more particularly, to a press for treating or finishing, e.g. embossing, the surface of a laminate and similar products comprised of a continuous web of material which is impregnated with a synthetic resin, for example, a paper impregnated with a synthetic resin.

BACKGROUND OF THE INVENTION

A laminate-embossing or laminating press can include a heated press roll, two guide or reversing rolls, and at least one tensioning roll for removing slack in the attendant belt system. All of these rolls are journaled with one end in a fixed support wall, and the other end of each roll is journaled in a movable support wall, i.e. the movable support wall can be selectively positioned in the direction of the respective central longitudinal axes of the rolls.

A pressure strip or belt is continuously passed about or tangentially along at the mentioned rolls. The decorating roll or sleeve, for imparting a decorative embossing to the adjacent surface of the laminate, is removably mounted on the press roll. Thus, the decorating roll sleeve can be slid over and off the press roll. The pressure belt provides a lead-in at the heated press roll near one guide roll for the product strip, whereas the product strip outlet is provided by the pressure belt at the other guide roll and also at the heated press roll.

The rolls are journaled in bearings which are arranged in the fixed support wall, and the other ends of the rolls are journaled in bearings which are arranged in the movable support wall. The movable support wall can be displaced parallel to the longitudinal axes of the rolls, and the movable support wall can be detached from the rolls. When the latter occurs, the rolls project in cantilever fashion from the fixed or stationary support wall.

It is known in the art to detach the movable support wall in order to access the free ends of the projecting rolls during replacement of the decorating roll sleeve and/or the pressure strip or belt as described. This may be done for replacing the pressure belt and/or the decorating roll sleeve. Prior to replacing the decorating roll sleeve, the tension on the pressure belt has to be released and the pressure belts removed. This entails labor intensive and time consuming operations. Although auxiliary equipment such as lifting tools, release devices and pressing tools and the like are employed, these auxiliary pieces of equipment are not integral components of the press. As well, they require special installation, adjustment and subsequent removal.

OBJECTS OF THE INVENTION

It is an object of our present invention to provide an improved press for the manufacture of laminates which allows replacement of the decorating roll sleeve in a simple manner.

It is also an object of the invention to provide a press in which substantially integral components are used to effect the replacement of a decorating roll sleeve.

It is a further object of the invention to provide a press which allows a very rapid replacement of a decorating roll sleeve.

SUMMARY OF THE INVENTION

These and other objects are attained in accordance with the invention with the aid of a lifter device arranged above the press roll for lifting the pressure belt which has been brought out of its tensioned condition. The lifter device has at least two transverse lift bars with suction heads, and the lift bars are arranged and distributed about the upper circumferential region of the press roll.

Furthermore, the press roll is provided with a compressed air inlet facility for the introduction of compressed air between the press roll and the decorating roll sleeve. The unit supplying compressed air can be activated for removing the decorating roll sleeve from the press roll.

The movable support wall comprises a clamping assembly for gripping the decorating roll sleeve, and the latter, when the pressure belt has been lifted, can be slid by movement of the movable support wall onto the press roll or withdrawn therefrom.

In accordance with a preferred embodiment of the invention, the lifting bars are movably arranged at a frame comprised of longitudinal and transverse connecting beams, so that each bar can be swung by such means as crank arms, lever-type transmissions, and at least one lifting piston-and-cylinder assembly.

The compressed air inlet can supply compressed air through air inlet bores arranged in the press roll, and the compressed air can flow to the upper surface of the press roll through radially directed air outlet bores or similar passages.

The invention makes use of the fact that in the presses of this type there is sufficient space available above the press roll and beneath the run of the pressure belt, in order to install the lifter device as mentioned and to integrate the latter with the press.

When the tension of the pressure belt is released by actuation of the tensioning roll, the decorating roll sleeve is readily moved and replaced. This is because during this operation the decorating roll sleeve is floatingly supported on a compressed air cushion, and the compressed air can effect a corresponding increase or expansion. This effect can also be employed during mounting of the decorating roll sleeve. However, thermal expansion techniques can also be employed. In any event, the replacement of decorating rolls can be done quickly and with little effort, quasi automatically as it were.

In accordance with the principles of the invention, the clamping assembly at the movable support wall has an upper annular section onto which the decorating roll sleeve can be slid when the decorating roll sleeve is to be replacement. Furthermore, the decorating roll sleeve which can have been mounted on the annular section can be pressed against the annular section, and it can be locked thereon by a lock element.

In general terms, all movements required for the replacement of the decorating roll sleeve can be done with the assistance of the movable support wall.

On the other hand, additional means can be provided for effecting the replacement of the decorating roll sleeve. These means must then provide for the shifting of the decorating roll sleeve towards the movable support wall and, respectively, from the movable support wall in the direction towards the press roll. Accordingly, the kinematics of the interconnections are simplified.

The replacement piston-and-cylinder assemblies are provided at the fixed support wall and at the movable support wall. These piston-and-cylinder assemblies can be employed to effect any desired additional mounting or take-down effort.

DESCRIPTION OF THE INVENTION

The above and other objects, features and advantages of the present invention will become more readily apparent from the following description, reference being made to the accompanying highly diagrammatic drawing in which:

FIG. 5 is a cross section along line V—V in FIG. 2; and

SPECIFIC DESCRIPTION

Figure 1:
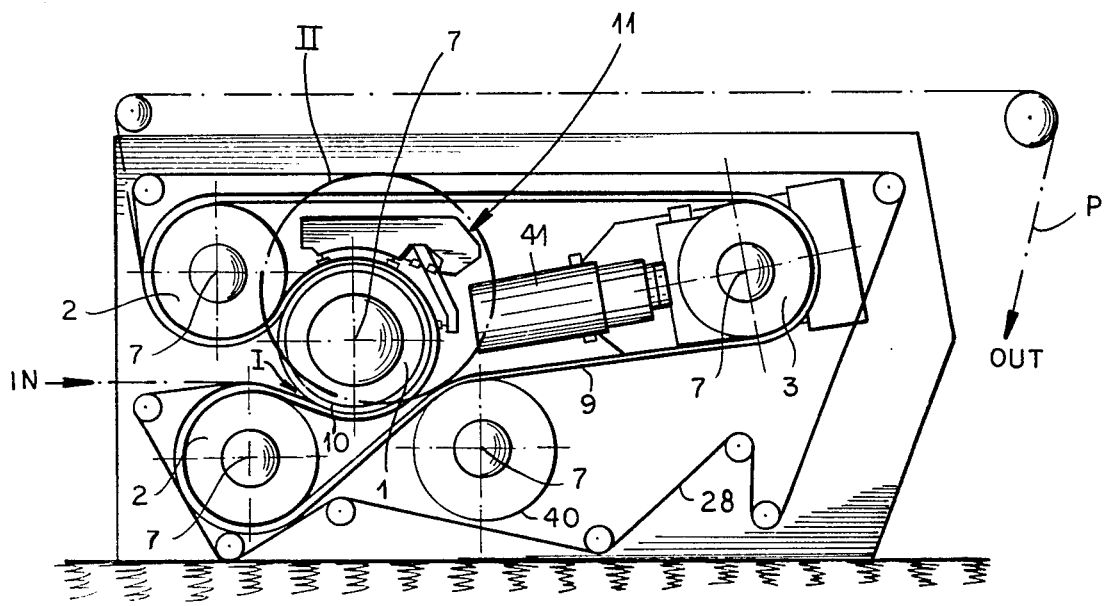
FIG. 1 is a side elevation showing schematically a press for decorating laminates.

The press shown in FIG. 1 can be operated in a continuous manner for the manufacture of laminates and similar pressed products made of a continuous web of material which is impregnated with a synthetic resin, for example, paper impregnated with a synthetic resin. More specifically, the press can be used to emboss or similarly decorate the surface of the product strip.

The press is generally shown schematically, and without the customary web feed and processing units at the inlet and exit sides thereof.

The press includes a heated central support wall or press roll 1, two guide or reversing rolls 2, and one tensioning roll 3 for adjusting belt tension. The mentioned rolls are equipped with customary drives, not shown.

The rolls 1, 2 and 3 are typically journaled, as is shown in greater detail only for roll 1 in FIG. 5, in bearings 4. The bearings 4, in turn, are mounted in the fixed support wall or press shield which is generally identified by reference numeral 5. The other end of each roll is typically journaled in a bearing 6 of the movable support wall 8. Accordingly, the movable support wall 8 can be moved in the direction of the longitudinal axes of the rolls, compare FIGS. 1 and 5.

Thus, in FIG. 5 the fixed support wall 5 is shown on the right, and this support wall 5 is secured in an anchor or similar footing 5.1 in the ground.

The movable support wall 8 is mounted on a track 8.1 by a carriage, dolly or wagon generally identified at 8.2. The respective shaft end 1.2 of each roll is guided by way of an idler roller 8.3 mounted at the support wall 8, and additional support can be provided by way of posts and the like, generally identified by reference numeral 8.4. Accordingly, the respective rolls, 1, 2, 3, etc. will be supported in cantilever fashion when the movable support wall 8 can have been moved (to the left in FIG. 5) out of the way in conjunction with the replacement operation for a decorating roll sleeve 10. The respective shaft components, as typically identified by reference numeral 1.2 in FIG. 5 are detachable from the respective roll, say, by actuation of a piston-and-cylinder assembly 8.5. This is known in the art and is not described in greater detail.

As can best be seen with reference to FIG. 1, a pressure strip or belt 9 is passed over rolls 1, 2 and 3, and the pressure belt generally tangentially touches the lower guide roll 40. At the lower guide roll 2 and the press roll 1, the pressure belt 9 defines an inlet I for the product strip or laminate, with the latter being generally identified by reference character P. The exit 0 (FIG. 2) for the product strip P is defined by the pressure belt 9 at the upper guide roll 2 and the press roll 1.

The decorating sleeve or roll 10 can be mounted on the press roll 1 by being slid onto the press roll 1. The decorating roll sleeve 10 serves to emboss or similarly decorate the upper surface of the product strip or laminate P. For replacement of a decorating roll sleeve 10, say, to change the embossing design, the decorating roll sleeve 10 can be removed from the press roll 1, accordingly. The embossing ridges are shown at 10a in FIG. 6.

A lifter device 11 is arranged above the press roll 1, and this lifter device 11 is secured at the fixed support wall 5. For lifting the pressure belt 9, in the condition when the latter is not tensioned by the tensioning roll 3, the lifter device 11 can have three transverse left bars 12, each having a plurality of suction heads or cups 13. The transverse lift bars 12 are distributed about the upper circumferential region of the press roll 1.

The press roll 1 is provided with means for supplying compressed air, generally designated by reference numeral 14, for the introduction of compressed air between the press roll 1 and the decorating roll sleeve 10. The flow of compressed air can be activated for taking the decorating roll sleeve 10 down from the press roll 1.

Figure 2:
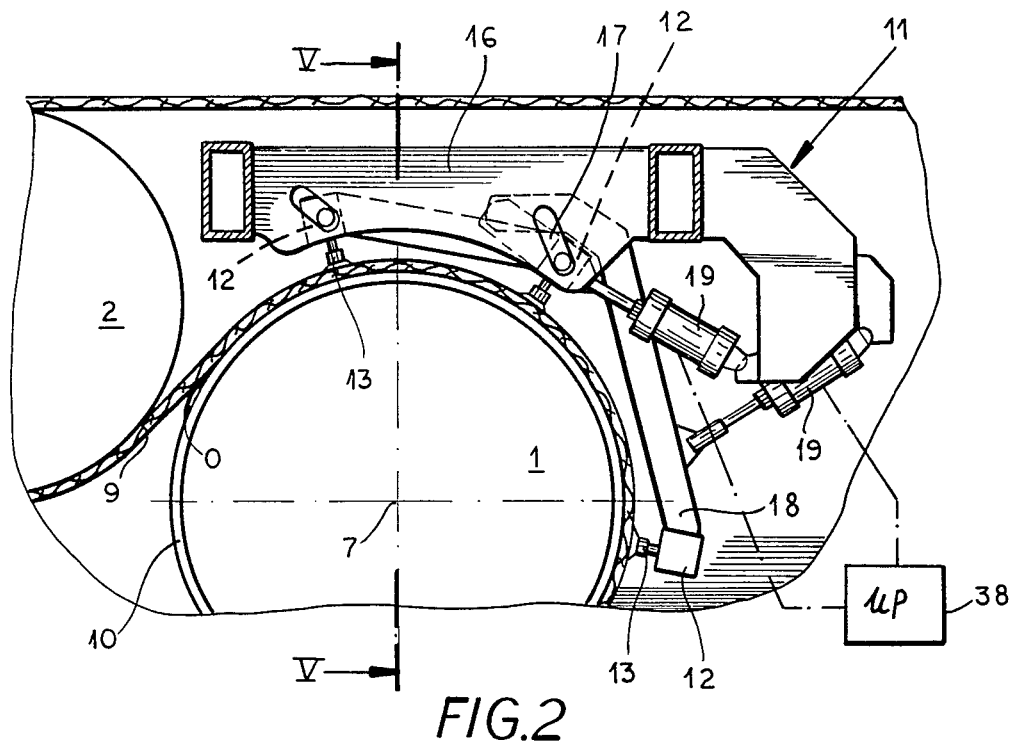
FIG. 2 is an enlarged detail of the region 11 of FIG. 1.

As can best be seen in FIG. 2, the pressure belt 9 is tautly positioned on the press roll 1.

Figure 3:
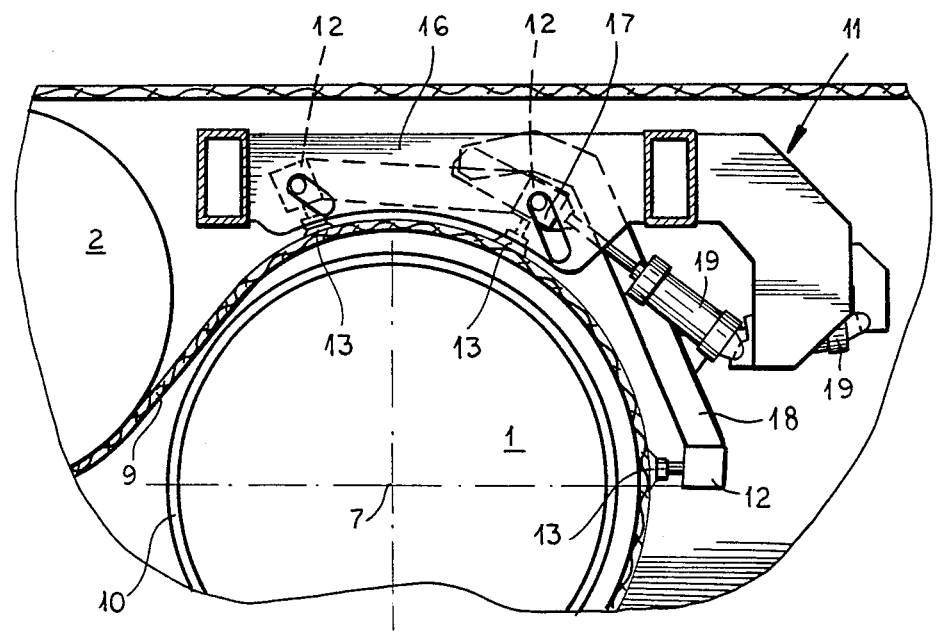
FIG. 3 is a view corresponding to that of FIG. 2, but showing a different position of the pressure belt and attendant components.

On the other hand, FIG. 3 shows the condition wherein the tensioning of the pressure belt 9 has been released, by a corresponding movement of the tensioning roll 3, e.g. as commanded by controller 38, and the pressure belt 9 is then lifted by the lifter device 11. Next, the decorating roll sleeve 10 can be readily removed by sliding it from the press roll 1.

The removing of the decorating roll sleeve from the press roll 1 is done with a clamping assembly 15 (FIG. 5) provided at the movable support wall 8. Thus, when the pressure belt 9 has been lifted by way of the lifter device 11, the decorating roll sleeve 10 can be slid onto the press roll 1 and removed therefrom in accordance with the movement of the movable support wall 8.

Figure 4:
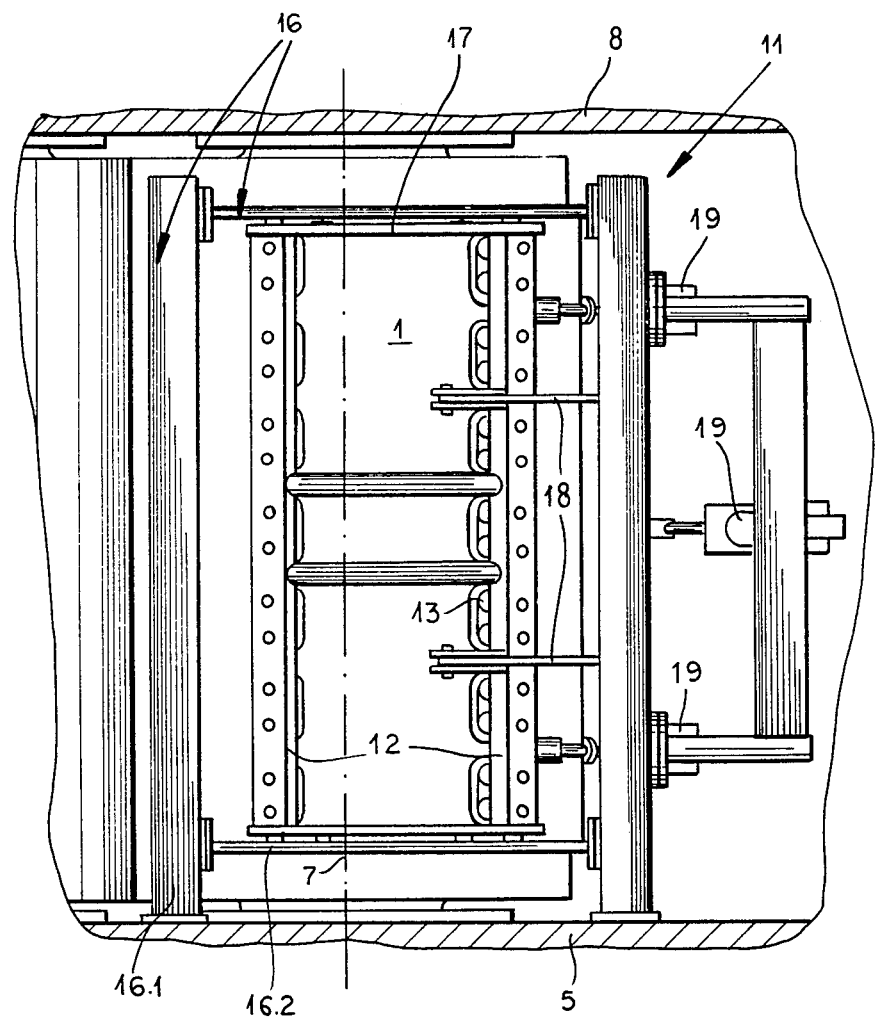
FIG. 4 is a top plan view of the assembly in FIG. 2.

From FIGS. 2 to 4, it is clear that the transverse lift bars 12 are journaled at a frame 16 which is comprised of longitudinal beams 16.1 and transverse connecting beams 16.2. The lift bars 12 can be moved together, by being swung or displaced with reference to the frame 16, and use is made of crank arms 17, lever linkages or actuators 18, and interconnected piston-and-cylinder assemblies 19.

The facility 14 for supplying compressed air is only schematically shown in FIG. 5 and the shaft 1.1 of the press roll 1 can have a respective channel or passage 20 extending coaxially with the longitudinal central axis 7 of the press roll 1. The press roll 1 also can have radially extending passages or ducts 21 which are in communication with the central passage 20 and are connected to the ambient atmosphere at the surface of the press roll 1.

The clamping assembly 15 includes an upper annular section 22 (FIG. 5) onto which the decorating roll sleeve 10 can be slid during the replacing operation. A decorating roll sleeve 10 which has been slid onto the annular section 22 can be pressed against the annular section 22, and it can be locked by way of a lock element 23 which engages in an exterior annular groove 24. The corresponding actuation is by way of piston-and-cylinder assembly 25.

The press also includes piston-and-cylinder assemblies 26 at the fixed support wall 5, and these can serve to assist in the removal of the decorating roll sleeve 10. The piston-and-cylinder assembly 27 at the movable support wall 8, in turn, serves during the mounting of a decorating roll sleeve 10.

Replacing of the decorating roll sleeve 10 can be done in the manner as described in the following.

A protective strip 28 is introduced between the press roll 1 and the pressure belt 9, compare FIG. 1. The tensioning of the pressure belt is then released by actuating the respective piston-cylinder assembly 41, and the pressure belt 9 can be moved with the protective strip 28 over the respective drive assemblies, so that the two are sufficiently loosely positioned on the press roll 1, i.e. on the decorating roll sleeve 10 sleeve thereon.

The transverse lift bars 12 are then lowered, by a corresponding movement of the lifter device 11, to place the suction cups 13 onto the belt 9. On reversing the movement of the lifter device 11, the pressure belt 9 is lifted, as is generally indicated by the different positions thereof in FIGS. 2 and 3.

The piston-and-cylinder assemblies 26 are actuated next, and the pistons thereof engage at the respective end of the decorating roll sleeve 10. At the same time, compressed air is introduced from the source 14, through the passages 20 and 21 to provide an air cushion or film which is of sufficient magnitude to make the decorating roll sleeve 10 glide, or move with very low friction, on the press roll 1.

It is also within the scope of the invention to provide the press roll 1 with complementary conical formations which permit expansion and contraction and thus facilitate the mounting and removal of the decorating roll sleeve 10, as well as the securing thereof.

The piston-and-cylinder assembly 26 serves to push the decorating roll sleeve from the press roll 1 until the clamping device 15 can grasp and secure the roll sleeve 10, which is then part of the movable support wall 8 as it were. The pistons of the piston-and-cylinder assemblies 26 can then be retracted.

Next, the movable support wall 8 is displaced for a distance sufficient to allow full removal of the decorating roll sleeve 10 from the press roll. A support carriage or like support 29 can be brought to the final position of the movable support wall 8 so that the decorating roll sleeve 10 can be lowered thereonto. Conversely, the cart 29 can be used to deliver a decorating roll sleeve 10 for mounting it on the press roll 1. The support cart 29 is shown schematically only in dot-dash outline in FIG. 5. The platform or retainer 30 of the support cart 29 can be lowered and lifted to align the decorating roll sleeve 10 for mounting it or for removing it.

Thus, the mounting of a decorating roll sleeve 10 is done after the cart 29 has driven it between the press roll 1 and the movable support wall 8, the roll has been elevated, and the roll has been clamped in the clamping assembly 15. The cart 29 is then retracted and the movable support wall 8 is returned to the position indicated in FIG. 5 to complete the assembly. The piston-and-cylinder assemblies 27 serve to position the decorating roll sleeve 10 in its final operating position, upon release of the clamping device 15.

Figure 6:
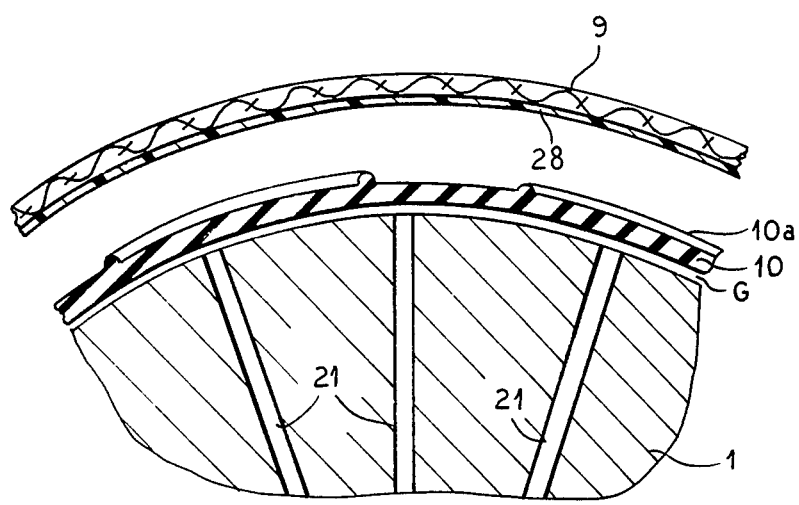
FIG. 6 is a detail of the press roll.

The described steps can readily be carried out in automatic manner using a modern drive and control means such as the microcomputer controller 38 which is coupled to the carriage and the various cylinder arrangements shown and the compressed air source feeding air into the gap G formed by the air pressure (FIGS. 5 and 6).

We claim:

1. A press for the continuous treatment of a laminate web which is transported through the press, said press comprising:
   a fixed support wall;
   a movable support wall spaced from and opposite said fixed support wall;
   means for selectively displacing said movable support wall with respect to said fixed support wall;
   a heated press roll mounted in said fixed support wall and releasably mounted in said movable support wall;
   a decorating roll sleeve on and removable from said press roll;
   at least two guide rolls mounted in spaced relation with respect to said press roll in said fixed support wall and releasably mounted in said movable support wall;
   a pressure belt wound about said at least two guide rolls and said press roll on top of the decorating roll sleeve;
   at least one tensioning roll for subjecting said pressure belt to tension;
   a lifter device for moving said pressure belt out of contact with said decorating roll sleeve, said lifter device including at least two transverse lift bars with suction heads, with said transverse lift bars being distributed about an upper circumferential region of said press roll;
   means for supplying compressed air to said press roll at least when the respective decorating roll sleeve is to be removed from said press roll; and
   a clamping device at said movable support wall adapted to grip a decorating roll sleeve when said pressure belt has been raised by said lifter device, for slidingly displacing the decorating roll sleeve with the motion of said movable support wall relative to said press roll.

2. The press defined in claim 1 wherein said means for supplying compressed air includes a central longitudinal passage in said press roll and radially disposed passages connecting said central longitudinal passage with an exterior surface of said press roll, said central longitudinal passage being adapted to be connected to a source of compressed air.

3. The press defined in claim 1, further comprising first bearing means for journaling an end of said press roll, ends of said guide rolls, and an end of said at least one tensioning roll on said fixed support wall; and second bearing means for journaling other ends of said press roll, said guide rolls, and said at least one tensioning roll in detachable manner at said movable support wall.

4. The press defined in claim 1 wherein said movable support wall is mounted so that it can be displaced in the direction of the central longitudinal axis of said press roll.

5. The press defined in claim 1 wherein said press roll, said guide rolls and said at least one tensioning roll are positioned parallel to one another.

6. The press defined in claim 1 wherein said pressure belt is lifted in the condition in which the tension thereof has been released by said at least one tensioning roll.

7. The press defined in claim 1 wherein said transverse lift bars are movably mounted at a frame comprised of longitudinal and transverse connecting beams, further comprising means for moving said lift bars with respect to said pressure belt.

8. The press defined in claim 7 wherein said means for moving includes crank arms, lever-type transmissions, and at least one lifting piston-and-cylinder assembly.

9. The press defined in claim 1 wherein said clamping device includes an upper annular section onto which the respective decorating roll sleeve can be slid during replacement thereof, means for pressing a decorating roll sleeve which has been slid onto said annular section against said annular section, and means for locking said decorating roll sleeve on said section.

10. The press defined in claim 1 wherein said fixed support wall has piston-and-cylinder assemblies for axially displacing said decorating roll sleeve.

11. The press defined in claim 1 wherein said movable support wall has piston-and-cylinder assemblies for axially displacing said decorating roll sleeve.

12. The press defined in claim 1, further comprising a protective strip insertable between said press roll and said pressure belt for moving said pressure belt.

13. The press defined in claim 1 wherein said press roll has complementary formations which facilitate mounting and removal of a respective decorating roll sleeve.

14. The press defined in claim 1, further comprising means for delivering to and removing from said press roll a respective decorating roll sleeve.

15. A continuously operable press for the manufacture of laminates and similar compacted products made of a continuous web of material which is impregnated with a synthetic resin for example, papers impregnated with a synthetic resin, said press having a heated press roll, two guide rolls, and at least one tensioning roll, wherein said rolls are respectively journaled in bearings at a fixed support wall and said roll are journaled at the other ends in bearings of a support wall which is movable in the direction of the longitudinal axes of the rolls, wherein a pressure belt is passed over said rolls, and wherein a decorating roll sleeve can be mounted on and removed from said press roll,
the improvement which comprises
a lifter device arranged above the press roll for elevating the relaxed pressure belt, said lifter device having at least two transverse lift bars with suction heads, and said lift bars being distributed about the upper circumferential region of said press roll,
a compressed air supply means at said press roll for the introduction of compressed air between the press roll and said decorating roll sleeve, said compressed air being adapted to be activated for taking the respective decorating roll sleeve down, and a clamping device for gripping a respective decorating roll sleeve for mounting and removing a respective decorating roll sleeve at said press roll by way of the action of and with the movable support wall, at said press roll when said pressure belt has been lifted.

16. The press defined in claim 15 wherein said pressure belt defines a product strip outlet and a product strip inlet with said pressure roll and a respective guide roll.

* * * * *